United States Patent [19]

Stewart

[11] 3,901,805
[45] Aug. 26, 1975

[54] REMOVING TOXIC CHROMIUM FROM INDUSTRIAL EFFLUENTS

[75] Inventor: Ronald Stewart, Williamsburg, Va.

[73] Assignee: Dow Badische Company, Williamsburg, Va.

[22] Filed: Dec. 5, 1974

[21] Appl. No.: 529,865

Related U.S. Application Data

[63] Continuation-in-part of Ser. No. 409,200, Oct. 24, 1973, abandoned, which is a continuation-in-part of Ser. No. 276,638, July 31, 1972, abandoned.

[52] U.S. Cl. .................................. 210/50; 210/59
[51] Int. Cl.$^2$ ............................................ C02C 5/02
[58] Field of Search ........... 210/49, 50, 59; 423/607

[56] References Cited
UNITED STATES PATENTS

| | | | |
|---|---|---|---|
| 3,294,680 | 12/1966 | Lancy | 210/50 X |
| 3,391,789 | 7/1968 | Zievers et al. | 210/50 X |
| 3,575,853 | 4/1971 | Gaughan et al. | 210/50 X |
| 3,575,854 | 4/1971 | Richards | 210/50 |
| 3,716,485 | 2/1973 | Robertson | 210/50 |

OTHER PUBLICATIONS

Disposal of Waste Liquors from Chromium Plating, Hoover and Masselli, Jan. 1941, pp. 131–134, *Ind. & Eng. Chem.*, Vol. 33, No. 1.

*Primary Examiner*—Samih N. Zaharna
*Assistant Examiner*—Robert H. Spitzer
*Attorney, Agent, or Firm*—George F. Helfrich

[57] ABSTRACT

A fluid reducing agent (e.g., sulfur dioxide) is injected into an essentially unimpeded stream of an acidified aqueous industrial effluent flowing in a simple conduit which is a mere passageway having no baffles or other obstructive or detaining means therein, the stream containing soluble chromium (VI) and having a turbulence characterized by a Reynolds Number of at least about 5,000. The resulting chromium (III) is then precipitated as $Cr(OH)_3$, which is allowed to settle and is subsequently separated from the essentially chromium-free supernatant.

4 Claims, No Drawings

REMOVING TOXIC CHROMIUM FROM INDUSTRIAL EFFLUENTS

CROSS REFERENCE

This application is a Continuation-in-part of my co-pending application Ser. No. 409,200, filed Oct. 24, 1973 and now abandoned, which is a Continuation-in-part of application Ser. No. 276,638, filed July 31, 1972, now abandoned.

BACKGROUND OF THE INVENTION

1. Field of the Invention

This invention relates generally to the purification of liquids, and, in particular, to a process for removing chromium impurities from aqueous industrial effluents prior to their entry into public waters.

2. Prior Art

Because chromium compounds are used extensively in industrial processes (e.g., chromates are generally added to cooling water for corrosion control), they will readily enter a water supply or potential source of supply through the discharge of industrial effluents therein. However, the carcinogenic potential of chromium, particularly hexavalent chromium, is a compelling reason to protect any body of water against such an intrusion.

Accordingly, a number of expedients have been proposed in an attempt to effect removal of chromium, particularly hexavalent chromium, from industrial effluents. The most satisfactory of these methods are based upon (I) reducing the chromium to its trivalent state, followed by (II) precipitating the trivalent chromium as chromic hydroxide, according to the following equations:

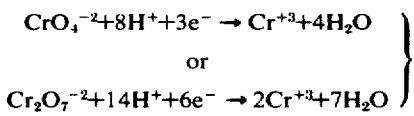

(I)

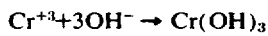

(II)

See, for example, "Blowdown Toxicity Banished in 90,000- gpd System," *Chemical Processing*, September 1971, pp. 17–18; Robertson, U.S. Pat. No. 3,716,485; and Zievers, U.S. Pat. No. 3,391,789.

The efficacy of such methods is not in dispute. However, costly equipment — esp. mixing chambers or reduction tanks, as well as internally-baffled detention chambers, which are required to provide turbulence and increase the residence time for the chromium reduction; precise automatic controls, e.g., for pH and rate of flow of reducing agent; as well as motor driven impellers or stirring means — all present a heavy burden on today's manufacturer, who must reduce manufacturing costs significantly in order to even maintain his competitive position.

SUMMARY OF THE INVENTION

It is consequently the primary object of this invention to provide a highly efficient, yet eminently simple and trouble-free, low-cost process for the removal of chromium, particularly hexavalent chromium, from aqueous industrial effluents. This object and the attending advantages are achieved by providing a process which comprises:

a. injecting a fluid acid and a reducing agent, most advantageously sulfur dioxide, into an essentially unimpeded stream of the effluent flowing through a simple conduit having no obstructing or detaining means such as baffles and no externally powered mixing means such as stirrers or impellers, the conduit being nothing more than a mere passageway for the conveying of effluent from one place to another;

b. effecting within the essentially unimpeded, flowing stream of acidified effluent and reducing agent in the conduit a turbulent condition characterized by a Reynolds Number of at least about 5,000, and preferably between about 5,000 and 40,000;

c. providing a residence time of at least about 30 seconds for the turbulent stream of acidified effluent and reducing agent within the conduit; whereby substantially complete reduction of chromium (VI) to chromium (III) is accomplished within the conduit; and d. neutralizing the effluent to precipite the chromium (III) as $Cr(OH)_3$, and separating the chromium-free supernatant from the precipitate.

Unexpected in view of the prior art is the finding that substantially complete reduction of chromium (VI) to chromium (III) can in fact be accomplished within an essentially unimpeded flowing stream of effluent in a simple conduit, thereby eliminating the necessity for: (1) a mixing chamber or reduction tank — and the precise control of pH therein, as well as the precise control of the rate of flow of reducing agent thereto and the use of motor-driven mixers or impellers in connection therewith; or (2) a detention chamber comprising internal obstructions or baffles for the purpose of increasing turbulence and hindering the flow of the fluid, thereby holding it until the desired reduction reaction has been completed. However, such substantially complete reduction of chromium (VI) to chromium (III) will in fact be accomplished within the essentially unimpeded flowing stream of effluent in the simple conduit only when the turbulence of the stream of effluent containing the reducing agent is characterized by a Reynolds Number of at least about 5,000, and preferably between about 5,000 and 40,000. Reynolds Number is defined in the art as the dimensionless value of the quotient $DUP/\mu$, wherein D is the inside diameter of the conduit, U is the average velocity of flow within the conduit, P is the density of the fluid flowing in the conduit, and $\mu$ is the viscosity of the fluid. Reynolds Numbers below about 2,000 correspond to "streamline" flow, while values above about 3,000 correspond to "turbulent" flow. The "turbulent" flow required by the process of the present invention corresponds to a Reynolds Number of at least about 5,000, revealing clearly that not every "turbulent" flow will suffice.

DESCRIPTION OF THE PREFERRED EMBODIMENTS

The present invention may be better understood by referring to the following illustrative examples, wherein all parts and percentages are by weight.

EXAMPLE 1

(This invention)

In accord with the present invention, a cooling tower blowdown stream containing about 30 parts of chromate (as $CrO_4^{-2}$) per million parts of the aqueous stream (ppm) was caused to enter a horizontal conduit comprising a simple plastic-lined steel pipe having an inside diameter of 2.7 inches and a length of 58 feet. The rate of flow of the stream was 22 gallons per minute. The pipe provided a mere passageway for the blowdown stream. It was not provided with baffles or other obstructive means or mixing means.

At a point 5 feet downstream of the conduit entrance, sulfur dioxide gas was continuously injected into the flowing blowdown stream. The gas was passed from a storage cylinder through a pressure regulator and rotometer and then horizontally into the flowing blowdown stream through a plastic-lined T flanged fitting. All materials in contact with the sulfur dioxide gas were stainless steel or glass. The flow of sulfur dioxide was adjusted to a rate of 1.0 pounds per hour, providing approximately 3 times the stoichiometric quantity necessary to reduce the chromium in the blowdown stream from the hexavalent to the trivalent state.

At a point 2 feet upstream of the entrance of the sulfur dioxide reducing agent, sulfuric acid (98% aqueous) was continuously injected into the flowing stream. The acid was pumped from a corrosion-resistant reciprocal pump through a section of plastic-lined steel pipe, thence through a plastic-lined steel check valve, and finally horizontally into the flowing blowdown stream through a plastic-lined steel T flanged fitting. The rate of flow of the acid was adjusted to effect a pH of 2.6 within the blowdown stream flowing through the conduit, and the pH was checked at approximately 8-hour intervals thereafter, further rate adjustments being made as necessary. A sample tap 46 feet from the entry point of sulfuric acid was employed to remove samples for pH testing.

The residence time of the blowdown stream in the simple conduit, i.e., the period of contact of blowdown stream, sulfur dioxide gas, and sulfuric acid before exit thereof from the conduit, was 46 seconds, and the turbulent flow of the stream in the conduit was determined to correspond to a Reynolds Number of 25,800.

After exiting the horizontal conduit, the reduced blowdown stream — which was colorless, indicating the essential absence of chromium (VI) — entered the caustic treatment area, wherein caustic was added to precipitate chromium (III) as chromic hydroxide — an insoluble, green precipitate under basic conditions. After settling of the precipitate, the supernatant liquid was drawn off for final disposal. At this point the total concentration of chromium was less than 0.1 ppm, as determined by standard methods of chemical analyses, well known in the art. Such a concentration is well below the acceptable level established by present day standards.

EXAMPLE 2

(This invention)

A process otherwise essentially identical to that carried out in Example 1 was followed, except that the rate of flow of the blowdown stream in the horizontal conduit was adjusted to provide a turbulent flow characterized by a Reynolds Number of about 5,500. After exiting the horizontal conduit, the reduced blowdown stream was colorless, indicating the essential absence of chromium (VI). The chromium (III) was then precipitated as $Cr(OH)_3$, which was allowed to settle and then separated from the essentially chromium-free supernatant. The result was an effluent having an acceptable level of chromium, according to present day standards.

EXAMPLE 3

(Not this invention — for comparison only)

A process otherwise essentially identical to that carried out in Example 1 was followed, except that the rate of flow of the blowdown stream was adjusted to provide a turbulent flow characterized by a Reynolds Number of about 4,500. After exiting the horizontal conduit, the blowdown stream had the distinct yellow color characteristic of unreduced chromium (VI). Under these conditions, the subsequent precipitation of the chromium (III) and separation of the $Cr(OH)_3$ precipitate do not result in an effluent having an acceptable level of chromium according to present day standards. Such a process is accordingly ineffectual and of no value.

EXAMPLE 4

(Not this invention — for comparison only)

A process otherwise essentially identical to that carried out in Example 1 was followed, except that the pH of the blowdown stream in the conduit was adjusted to a value of 3.5. After exiting the horizontal conduit, the blowdown stream had the distinct yellow color characteristic of unreduced chromium (VI). Under these conditions, the subsequent precipitation of chromium (III) and separation of the $Cr(OH)_3$ precipitate do not result in an effluent having an acceptable level of chromium according to present day standards. Such a process is accordingly ineffectual and of no value.

EXAMPLE 5

(Not this invention — for comparison only)

A process otherwise essentially identical to that carried out in Example 1 was followed, except that the pH of the blowdown stream in the conduit was adjusted to a value of 1.5. Although the total concentration of chromium in the supernatant from the caustic precipitation was within acceptable limits, the usage of sulfuric acid was so excessive that the economic feasibility of such a process would be at best marginal.

From the foregoing illustrative examples it is seen that the turbulent flow required by the process according to the present invention is characterized by a Reynolds Number of at least about 5,000. At values below about 5,000 the efficiency of the reduction reaction falls off very rapidly, resulting in the presence of an undesirably high, and therefore unacceptable, concentration of chromium (VI) in the treated effluent. However, no technical or technological advantage whatever is achieved if the turbulence exceeds a value corresponding to a Reynolds Number of greater than about 40,000. As satisfactory results are not achieved if the turbulence is characterized by a Reynolds Number below about 5,000, this parameter is considered critical in the practice of the present process.

Moreover, in the process according to the present invention it has been found essential that the residence time, i.e., the period of contact of effluent and reducing agent in the turbulent stream, be at least about 30 seconds, in order that the reduction of chromium (VI) may proceed to substantial completion. Residence times less than about 30 seconds are therefore to be avoided; and residence times far in excess of 30 seconds are not deemed to afford any particular advantage.

Furthermore, satisfactory results are also obtained if, in place of sulfur dioxide gas, one of the following is employed as the fluid reducing agent in the process according to the present invention: (a) an aqueous solution of a metallic sulfite, e.g., sodium sulfite; (b) an aqueous solution of a metallic hydrogen sulfite, e.g., sodium hydrogen sulfite; (c) an aqueous solution of a ferrous salt, e.g., ferrous sulfate; and (d) hydrogen sulfide gas. Although other reducing agents may, of course, be employed, those listed here are to be preferred in the process according to the present invention, sulfur dioxide being especially advantageous.

When sulfur dioxide gas is employed as the fluid reducing agent, it is clearly of especial advantage to control the pH of the flowing stream of effluent between about 2 and 3. As shown by the foregoing examples, at a pH of greater than about 3, the reduction reaction is not as effective; and at a pH of less than about 2, acid usage becomes excessive and the process economically undesirable.

Although the present invention has been described in detail with respect to certain preferred embodiments thereof, it is apparent to those of skill in the art that variations and modifications in this detail may be effected without any departure from the spirit and scope of the present invention, as defined in the heretoappended claims.

What is claimed is:

1. A process for removing soluble chromium (VI) from an aqueous industrial effluent, which process comprises:
   a. injecting a fluid acid and a fluid reducing agent into an essentially unimpeded stream of the effluent flowing through a simple conduit having no mixing or obstructive means located therein;
   b. effecting within the essentially unimpeded flowing stream of acidified effluent and reducing agent in the conduit a turbulent condition characterized by a Reynolds Number of at least about 5,000;
   c. providing a residence time of at least about 30 seconds for the turbulent stream of acidified effluent and reducing agent within the conduit; whereby substantially complete reduction of chromium (VI) to chromium (III) is accomplished within the conduit; and
   d. neutralizing the effluent to precipitate the chromium (III) as $Cr(OH)_3$, and separating the chromium-free supernatant from the precipitate.

2. The process according to claim 1, wherein the fluid reducing agent is selected from the group consisting of: (a) sulfur dioxide; (b) an aqueous solution of a metallic sulfite; (c) an aqueous solution of a metallic hydrogen sulfite; (d) an aqueous solution of a ferrous salt; and (e) hydrogen sulfide gas.

3. The process according to claim 2, wherein the fluid reducing agent is sulfur dioxide and the acid content of the stream of effluent and reducing agent is controlled at a pH of between about 2 and 3.

4. The process according to claim 3, wherein the turbulent condition is characterized by a Reynolds Number of between about 5,000 and 40,000.

* * * * *